United States Patent [19]

Shioji et al.

[11] Patent Number: 4,892,902

[45] Date of Patent: Jan. 9, 1990

[54] METHOD FOR PRODUCTION OF AQUEOUS DISPERSION OF INORGANIC PIGMENT

[75] Inventors: Shobu Shioji, Himeji; Masazumi Sasabe, Kakogawa; Yorimichi Dairoku, Himeji; Teruaki Fujiwara, Nagaokakyo, all of Japan

[73] Assignee: Nippon Shokubai Kagaku, Co., Ltd., Osaka, Japan

[21] Appl. No.: 328,687

[22] Filed: Mar. 27, 1989

Related U.S. Application Data

[62] Division of Ser. No. 118,311, Nov. 6, 1987, Pat. No. 4,818,783.

[30] Foreign Application Priority Data

| Nov. 7, 1986 | [JP] | Japan | 61-263843 |
| Nov. 14, 1986 | [JP] | Japan | 61-269775 |
| Nov. 17, 1986 | [JP] | Japan | 61-271964 |
| Nov. 21, 1986 | [JP] | Japan | 61-276451 |
| Nov. 21, 1986 | [JP] | Japan | 61-276452 |
| Apr. 13, 1987 | [JP] | Japan | 62-88704 |

[51] Int. Cl.$^4$ .................. C08K 3/32; C08L 29/04
[52] U.S. Cl. ........................ 524/417; 524/425; 524/437; 524/547; 524/557
[58] Field of Search ............ 524/417, 425, 437, 547, 524/557; 106/499

[56] References Cited

U.S. PATENT DOCUMENTS

| 3,477,970 | 11/1969 | Beeman | 524/425 |
| 3,501,424 | 3/1970 | Imoto | 524/503 |
| 4,175,066 | 11/1979 | Shibazaki et al. | 526/271 |
| 4,271,221 | 6/1981 | Hosmer | 524/503 |
| 4,519,920 | 5/1985 | Fukumoto et al. | 524/425 |
| 4,555,557 | 11/1985 | Fukumoto et al. | 526/240 |

FOREIGN PATENT DOCUMENTS

| 96027 | 9/1974 | Japan | 524/557 |
| 23850 | 8/1975 | Japan . | |
| 144498 | 12/1978 | Japan . | |
| 144499 | 12/1978 | Japan . | |
| 138731 | 10/1979 | Japan | 524/557 |
| 36166 | 11/1979 | Japan . | |
| 115194 | 7/1983 | Japan | 524/557 |
| 193964 | 11/1984 | Japan . | |
| 262862 | 12/1985 | Japan . | |

Primary Examiner—John C. Bleutge
Assistant Examiner—David Buttner
Attorney, Agent, or Firm—Omri M. Behr

[57] ABSTRACT

A method for the production of an aqueous dispersion by the dispersion of an inorganic pigment such as calcium carbonate and aluminum hydroxide in an aqueous medium, which method comprises incorporating in said inorganic pigment as a dispersant a carboxyl group-containing water-soluble polymer possessing a number average molecular weight in the range of 2,000 to 80,000 and/or a water-soluble condensed phospate and a water-soluble anionic modified polyvinyul alcohol possessing a polymerization degree in the range of 30 to 700, a saponification degree in the range of 30 to 100 mol %, and an anionic modification degree in the range of 0.5 to 20 mol %.

10 Claims, 1 Drawing Sheet

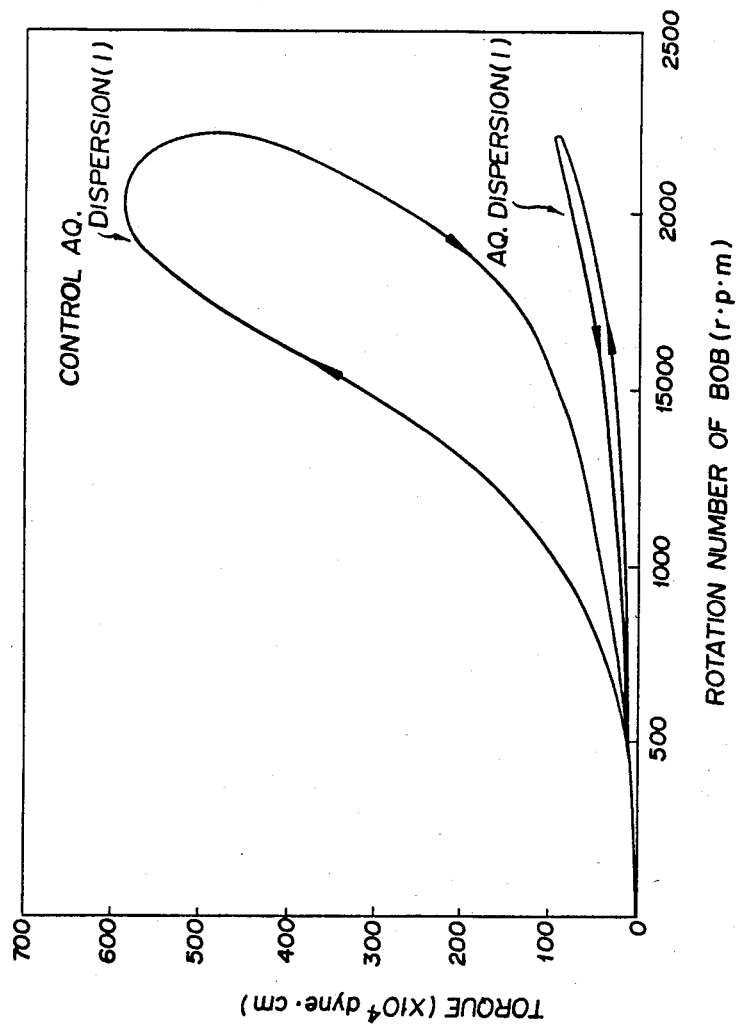

METHOD FOR PRODUCTION OF AQUEOUS DISPERSION OF INORGANIC PIGMENT

This application is a division of application Ser. No. 118,311 filed Nov. 6, 1987, now U.S. Pat. No. 4,818,783.

BACKGROUND OF THE INVENTION

1. Field of the Invention

This invention relates to a method for the production by efficient dispersion of an inorganic pigment in an aqueous medium, and more particularly to a method for the production of an aqueous dispersion of inorganic pigment, characterized by jointly using, as dispersants, a carboxyl group-containing water-soluble polymer possessing a specific number average molecular weight and/or a water-soluble condensed salt of phosphoric acid and a specific water-soluble anionic modified polyvinyl alcohol.

2. Description of the Prior Art

Calcium carbonate, as an example of inorganic pigments, is inexpensive and excellent in whiteness, affinity for ink, gloss, and printability and, therefore, is counted among the pigments which are popularly used as in the papermaking industry. Further, owing to the dissemination of neutral paper, the amount of calcium carbonate used in the papermaking industry is increasing sharply.

Heretofore, the so-called heavy calcium carbonate possessing an average particle diameter of about 1 micron has been prevalently used in the various grades of calcium carbonate. In recent years, in the total consumption of all grades of calcium carbonate, the proportion of consumption of sedimenting light calcium carbonate having an average particle diameter of 0.1 to 0.5 micron is now increasing in consequence of the growing trend of paper products toward improvement of quality. A decrease in the average particle diameter of such calcium carbonate, however, results in increased difficulty of the dispersion of the compound in an aqueous medium, increased liability of the compound to coagulation, and increased impairment of the stability of the produced aqueous dispersion on aging.

The dispersants heretofore used for calcium carbonate, in the category of inorganic compounds, include such condensed phosphates as pyrophosphates, tripolyphosphates, trimetaphosphates, tetrametaphosphates, and hexametaphosphates, zinc salts, and silicates. These inorganic dispersants, however, entail the disadvantage that the aqueous dispersions produced with the dispersants have no perfect lasting stability. In the case of the dispersion of sedimenting light calcium carbonate in the form of microfine powder, there arises a serious drawback that the film produced suffers from poor water resistance because the dispersion calls for addition of a large amount of dispersant.

As organic dispersants, such polycarboxylates as polyacrylates, polymethacrylates, and polymaleates and polyvinyl alcohol have been known to the art.

Polysodium acrylate, a typical example of polycarboxylates, has been rated rather high in usefulness for the dispersion of heavy calcium carbonate possessing an average particle diameter of about 1 micron. When this dispersant is used in the dispersion of extremely fine calcium carbonate powder having an average particle diameter approximately in the range of 0.1 to 0.5 micron, however, the produced aqueous dispersion has a drawback that it has high viscosity and lacks lasting stability. Polyvinyl alcohol is described in Japanese Patent Laid-Open SHO 60(1985)- 262,862, for example, as possessing an ability to provide effective dispersion of inorganic pigments. The dispersant disclosed in Japanese Patent Laid-Open SHO 60(1985)-262,862, however, is insoluble in water and is not sufficiently effective in dispersing calcium carbonate. Further, when this dispersant is used by itself, the produced aqueous dispersion possesses unusually high viscosity. It is, therefore, totally unfit for the production of a highly concentrated aqueous dispersion of calcium carbonate.

For the purpose of eliminating such drawbacks of the conventional dispersants as described above, methods resorting to use of maleic acid copolymers have been proposed by Japanese Patent Publication SHO 54(1979)-36,166, U.S. Pat. No. 4,175,066, Japanese Patent Laid-Open SHO 53(1978)-144,499, and U.S. Pat. Nos. 4,519,920 and 4,555,557, for example. The dispersant disclosed in Japanese Patent Publication SHO 54(1979)-36,166 is rated relatively high because the aqueous dispersion of calcium carbonate obtained therewith exhibits satisfactory flow characteristics (low high-shear viscosity). It nevertheless has much to be desired in the dispersion of the compound in such a high concentration as to produce a solid content exceeding 65% by weight. The dispersant disclosed in U. S. Pat. No. 4,175,066, though capable of producing an aqueous dispersion of microfine calcium carbonate powder with low viscosity, must be used in a large amount and suffers from such drawbacks as high cost and poor resistance of the produced film to water. The dispersant disclosed in Japanese Patent Laid-Open SHO 53(1978)-144,499 is capable of producing an aqueous dispersion of calcium carbonate with such an extremely high concentration as to produce a solid content of 70% by weight. It nevertheless must be used in such a large amount as 1.4% (based on calcium carbonate). The dispersant disclosed in U. S. Pat. Nos. 4,519,920 and 4,555,557 has a serious drawback that the produced aqueous calcium carbonate dispersion exhibits poor flow characteristics (high high-shear viscosity).

Japanese Patent Laid-Open SHO 59(1984)-193,964 proposes a method which resorts to use of an itaconic acid copolymer. The dispersant disclosed therein, however, has much to be desired as to the dispersion of calcite type cubic calcium carbonate possessing an average particle diameter of not more than 0.3 micron.

Aluminum hydroxide, a typical example of inorganic pigments, possesses high whiteness and imparts highly desirable smoothness and gloss to the produced paper and is counted among the pigments popularly used in the papermaking industry. As dispersants for such aluminum hydroxide, Japanese Patent Publication SHO 50(1975)-23,850 proposes use of a copolymer of an α, β-unsaturated carboxylic acid and a hydrophobic vinyl monomer and Japanese Patent Laid-Open SHO 53(1978)-144,498 proposes use of a copolymer of an unsaturated monocarboxylic acid and an .unsaturated dicarboxylic acid. These dispersants have much room for further because the aqueous dispersions produced therewith exhibit insufficient flow characteristics.

An object of this invention, therefore, is to provide a novel method for the production of an aqueous dispersion of inorganic pigment.

Another object of this invention is to provide a method for the production of a highly concentrated aqueous dispersion of inorganic pigment possessing low viscosity and high flowability and excelling in lasting stability, with a dispersant used in a small amount relative to the inorganic pigment.

SUMMARY OF THE INVENTION

The objects described above are accomplished by a method for the production of an aqueous dispersion by the dispersion of an inorganic pigment in an aqueous medium, which method comprises incorporating in the inorganic pigment as a dispersant (I) 0.1 to 2 parts by weight of at least one member selected from the group consisting of (a) a carboxyl group-containing water-soluble polymer possessing a number average molecular weight in the range of 2,000 to 80,000 and (b) a water-soluble condensed phosphate and (II) 0.03 to 1 part by weight of a water-soluble anionic modified polyvinyl alcohol possessing a polymerization degree in the range of 30 to 700, a saponification degree in the range of 30 to 100 mol%, and an anionic modification degree in the range of 0.5 to 20 mol%, respectively based on 100 parts by weight of the inorganic pigment.

We have found that while a carboxyl group-containing water-soluble polymer and/or a water-soluble phosphate and a water-soluble anionic modified polyvinyl alcohol manifest a very poor effect in the dispersion of an inorganic pigment such as, for example, light calcium carbonate in an aqueous medium, a carboxyl group-containing water-soluble polymer possessing a specific molecular weight and/or a specific condensed phosphate and a water-soluble polyvinyl alcohol possessing a specific polymerization degree, a specific saponification degree, and a specific anionic modification degree, when used jointly in a specific ration, bring about, in the dispersion, an effect notably improved to a level not attained by the conventional dispersant. The present invention has been perfected as the result.

In accordance with the present invention, since a specific carboxyl group-containing water-soluble polymer and/or a water-soluble condensed phosphate and a specific water-soluble anionic modified polyvinyl alcohol are jointly used in a specific ratio as a dispersant, inorganic pigment such as clay, calcium carbonate, titanium dioxide, satin white, aluminum hydroxide, talc, slaked lime, magnesium hydroxide, iron oxide red, cement, alumina, zirconia, silica, silicon carbide, or silicon nitride can be efficiently dispersed to produce a highly concentrated aqueous dispersion of the inorganic pigment with the dispersant used in a small amount relative to the amount of the inorganic pigment. The method of this invention is parlticularly effective in producing an aqueous dispersion of calcium carbonate or aluminum hydroxide. Further, since the aqueous dispersion of inorganic pigment obtained by the method of this invention possesses low viscosity and high flowability and retains these properties stably with small amount of dispersant in spite of aging, it can be advantageously utilized in applications such as to coating materials without adversely affecting the water proofness of the coat to be produced.

Though the mechanism responsible for the outstanding ability to cause dispersion which is manifested when (I) at least one member selected from the group consisting of (a) carboxyl group-containing water-soluble polymers and (b) a water-soluble condensed phosphate and (II) a water-soluble anionic modified polyvinyl alcohol are jointly used in the aforementioned ration is not necessarily clear, it may be logically explained by the following supposition. The carboxyl group-containing water-soluble polymer (a) and/or the water soluble condensed phosphate (b) are strongly deposited by adsorption on the surface of particles of the inorganic pigment and, therefore, the water-soluble anionic modified polyvinyl alcohol (II) does not occur at all or occurs only in a small amount in an adsorbed form on the surface of particles of the inorganic pigment. As the result, the concentration of the water-soluble anionic modified polyvinyl alcohol (II) in the aqueous medium is higher than when the use of the carboxyl group-containing water-soluble polymer (a) and/or the water-soluble condensed phosphate (b) is omitted. We have continued a diligent study on this phenomenon and consequently found that the carboxyl group-containing water-soluble polymer (a) and/or the water-soluble condensed phosphate (b) adsorbed on the surface of particles of the inorganic pigment and the water-soluble anionic modified polyvinyl alcohol (II) retained in the aqueous medium cooperate synergistically to enable the produced aqueous dispersion of inorganic pigment to acquire notably low viscosity and conspicuously high lasting stability.

BRIEF DESCRIPTION OF THE DRAWING

FIG. 1 is a rheogram showing the flow characteristics of an aqueous dispersion obtained by the method of this invention and an aqueous dispersion obtained by the conventional method.

DESCRIPTION OF PREFERRED EMBODIMENT

The carboxyl group-containing water-soluble polymer (a) to be used in the present invention is required to possess a number average molecular weight in the range of 2,000 to 80,000, preferably 4,000 to 20,000. If this molecular weight deviates from the scope mentioned above, the polymer (a) when used in combination with the water-soluble anionic modified polyvinyl alcohol (II) manifests an insufficient in the dispersion of the inorganic pigment. Specifically, the carboxyl group-containing water-soluble polymer (a) is (i) a polymer derived from at least one unsaturated monocarboxylic acid monomer selected from the group consisting of acrylic acid, methacrylic acid, and salts thereof, (ii) a polymer derived from 60 to 99.9 mol% of the unsaturated monocarboxylic acid monomer and 40 to 0.1 mol% of at least one unsaturated dicarboxylic acid monomer selected from the group consisting of maleic acid, fumaric acid, itaconic acid, and salts thereof, (iii) a polymer derived from 50 to 99.9 mol% of the unsaturated monocarboxylic acid monomer and 50 to 0.1 mol% of at least one unsaturated sulfonic acid monomer selected from the group consisting of sulfonate group-containing monomers and salts thereof, (iv) a polymer derived from 50 to 99.9 mol% of the unsaturated monocarboxylic acid monomer and 50 to 0.1 mol% hydroxyl group-containing monomers (v) a neutralization product of a polymer obtained by copolymerizing 1 mol of the unsaturated dicarboxylic acid monomer and 0.7 to 1.2 mols of an α-olefin of 2 to 7 carbon atoms, or any of the mixtures thereof.

As typical examples of the unsaturated monomer to be used for obtaining the carboxyl group-containing water-soluble polymer (a), there can be cited monocarboxylic acid type monomers such as acrylic acid, methacrylic acid, α-hydroxyacrylic acid, and crotonic acid; dicarboxylic acid type monomers such as itaconic acid, fumaric acid, maleic acid, citraconic acid, and aconitic acid; sulfonate group-containing monomers such as vinylsulfonic acid, allylsulfonic acid, methallylsulfonic acid, styrenesulfonic acid, 2-acrylamide-2-methylpropane sulfonic acid, 3-allyloxy-2-hydroxypropane sulfonic acid, sulfoethyl(meth)acrylate, sulfopropyl(meth-)acrylate, 2-hydroxysulfopropyl(meth)acrylate, and sulfoethyl maleimide; hydroxy group-containing unsaturated monomers such as 3-methyl-3-buten-1-ol (isopulenol), 3-methyl-2-buten-1-ol (pulenol), 2-methyl-3-buten-2-ol (isopulene alcohol), 2-hydroxyethyl(meth-)acrylate, polyethylene glycol mono(meth)acrylate, polypropylene glycol mono(meth)acrylate, polyethylene glycol monoisopulenol ether, polypropylene glycol monoisopulenol ether, polyethylene glycol monoallyl ether, polypropylene glycol monoallyl ether, glycerol monoallyl ether, allyl alcohol, N-methylol(meth)acrylamide, glycerol mono(meth)acrylate, and vinyl alcohol; α-olefinic monomers of 2 to 7 carbon atoms such as ethylene, propylene, 1-butene, isobutylene, α-amylene, 2-methyl-1-butene, 3-methyl-1-butene ( α-isoamylene), 1-hexene, and 1-heptene; phosphonate group-containing monomers such as (meth)acrylamide methane phosphonic acid and 2-(meth)acrylamide-2-methylpropane phosphonic acid; amide type monomers such as (meth-)acrylamide and t-butyl (meth)acrylamide; hydrophobic monomers such as (meth)acrylic esters, styrene, 2-methyl styrene, and vinyl acetate; nitrile type monomers such as (meth)acrylonitrile; cationic monomers such as dimethylaminoethyl (meth)acrylate and dimethylaminopropyl (meth)acrylamide; ketone type monomers such as methyl vinyl ketone and phenyl vinyl ketone; and ether type monomers such as methyl vinyl ether and phenyl vinyl ether.

The acid type monomers such as monocarboxylic acid type monomers, dicarboxylic acid type monomers, sulfonate group-containing monomers, and phosphonate group-containing monomers cited above can be used as acid form monomers or as salt form monomers obtained by neutralizing the acid form monomers with an alkali substance. When an acid form monomer is to be used, at least 30 mol% of the carboxyl group in the produced carboxyl group-containing water-soluble polymer (a) is desired to be neutralized with an alkali substance before the polymer is put to use, in due consideration of the effect of dispersion to be obtained. As examples of the alkali substance which is used effectively for this neutralization, there can be cited hydroxides and carbonates of sodium, potassium, and lithium; ammonia; organic amines, inorganic amines; and hydroxides and carbonates of calcium, magnesium, aluminum, and zinc. Among other alkali substances cited above, sodium hydroxide proves to be particularly desirable in the sense that it is inexpensive and readily available commercially.

The carboxyl group-containing water-soluble polymer (a) for use in the present invention can be produced by polymerizing the aforementioned unsaturated monomer by the conventional technique.

The polymerization in an aqueous solution, for example, can be carried out by the conventional method in the presence of a polymerization catalyst, typical examples of which include persulfates such as sodium persulfate and potassium persulfate; hydrogen peroxide; and water-soluble azo compounds such as 2,2'-azo-bis(2-aminodipropane) hydrochloride and 4,4'-azo-bis-4-cyanovaleric acid. The polymerization in an organic solvent such as methanol, isopropyl alcohol, or other similar alcohol, tetrahydrofuran, dioxane, or other similar ether, benzene, xylene, toluene, or other similar aromatic hydrocarbon compound, or methylethyl ketone, methyl isobutyl ketone, or other similar ketone can be carried out by the conventional method using a polymerization catalyst, typical examples of which include organic peroxides such as benzoyl peroxide, lauroyl peroxide, and peracetic acid; and oil-soluble azo compounds such as azo-bis-isobutylonitrile and 2,2'-azo-bis(4-methoxy-2,4-dimethyl valeronitrile).

As typical examples of the water-soluble condensed phosphate (b), there can be cited sodium, potassium, lithium, and other alkali metal salts, ammonium salts, and amine salts of pyrophosphoric acid, hexametaphosphoric acid, and tripolyphosphoric acid. Among other water-soluble condensed phosphates cited above, sodium, potassium, and amine salts of pyrophosphoric acid and hexametaphosphoric acid prove to be particularly desirable in the sense that they excel in ability to effect the dispersion and they are inexpensive.

The water-soluble anionic modified polyvinyl alcohol (II) to be used in the present invention is a polyvinyl alcohol having an anionic group contained in the molecular unit thereof, which is obtained by saponifying a vinyl acetate/anionic monomer copolymer, for example, by the conventional technique. To be used effectively for the purpose of this invention, it is required to possess a polymerization degree in the range of 30 to 700, preferably 100 to 300, a saponification degree in the range of 30 to 100 mol%, preferably 65 to 100 mol%, and an anionic modification degree in the range of 0.5 to 20 mol%, preferably 1 to 10 mol%. When the water-soluble anionic modified polyvinyl alcohol (II) to be selected for use in this happens to be such that any of the polymerization degree, the saponification degree, and the anionic modification degree deviates from the ranges, the effect manifested in the dispersion when this polymer is used in combination with the carboxyl group-containing water-soluble polymer (a) and/or the water-soluble condensed phosphate (b) is not sufficient. Particularly when the anionic modification degree of the water-soluble anionic modified polyvinyl alcohol (II) is less than 0.5 mol%, the anionic modified polyvinyl alcohol is substantially equal to an unmodified polyvinyl alcohol in quality and, therefore, the produced aqueous dispersion of inorganic pigment becomes deficient in lasting stability. If the anionic modification degree exceeds 20 mol%, a disadvantage arises that the dispersant must be added in a large amount.

As typical examples of the anionic monomer to be used for the anionic modification in the preparation of the water-soluble anionic modified polyvinyl alcohol (II), there can be cited sulfonic acid type monomers such as allyl sulfonic acid, methallyl sulfonic acid, styrene sulfonic acid, vinyl sulfonic acid, 3-allyloxy-2-hydroxypropane sulfonic acid, sulfoethyl (meth)acrylate, 2-acrylamide-2-methyl propane sulfonic acid, sulfoethyl maleimide, sulfoalkyl maleates, and monovalent metal salts, ammonium salts, and amine salts thereof; carboxylic acid type monomers such as acrylic acid, methacrylic acid, α-hydroxyacrylic acid,(anhydrous) maleic acid, itaconic acid, fumaric acid, crotonic acid, citraconic acid, and aconitic acid, and monovalent metal salts, ammonium salts, and amine salts thereof; and phosphoric acid type monomers such as (meth)-acrylamide methane phosphoric acid, 2-(meth)acrylamide-2-methylpropane phosphoric acid, mono(2-hydroxyethyl(meth)acrylate) acid phosphate, and mono(3-chloro-2-hydroxypropyl(meth)acrylate) acid phosphate, and monovalent metal salts, ammonium salts, and amine salts thereof.

The method for the production of the water-soluble anionic modified polyvinyl alcohol (II) is not limited to the saponification of the vinyl acetate/anionic monomer copolymer. Of course, the production can be effected, for example, by treating polyvinyl alcohol with bromine or iodine and subsequently modifying the treated polyvinyl alcohol with a sulfonating agent such as sodium hydrogen sulfite, by modifying polyvinyl alcohol with a concentrated aqueous sulfuric acid solution for conversion into a corresponding sulfuric ester, or by saponifying a vinyl acetate/(meth)acrylic ester copolymer, for example, for modification by carboxylation.

Among other various conceivable water-soluble anionic modified polyvinyl alcohols (II), water-soluble polyvinyl alcohol modified by sulfonation and water-soluble polyvinyl alcohol modified by carboxylation prove to be particularly desirable in the sense that they are inexpensively and easily produced on a commercial scale.

In the present invention, the carboxyl group-containing water-soluble polymer (a) and/or the water-soluble condensed phosphate (b) are used in an amount in the range of 0.1 to 2 parts by weight, preferably 0.2 to 1.5 parts by weight and the water-soluble anionic modified polyvinyl alcohol (II) in an amount in the range of 0.03 to 1 part by weight, preferably 0.05 to 0.8 part by weight, respectively based on 100 parts by weight of the inorganic pigment. If the amount of the carboxyl group-containing water-soluble polymer (a) and/or the water-soluble condensed phosphate (b) or the amount of the water-soluble anionic modified polyvinyl alcohol to be used is smaller than the lower limit of the range, the produced aqueous dispersion of inorganic pigment fails to acquire low viscosity and sufficient lasting stability. If the amount exceeds the upper limit of the range, the effect of dispersion cannot be increased proportionately to the excess amount. Conversely, the aqueous dispersion of inorganic pigment produced by using such compounds entails a disadvantage that the applied coating produced with the aqueous suspension offers insufficient waterproofness.

In the present invention, when the carboxyl group-containing water-soluble polymer (a) and/or the water-soluble condensed phosphate (b) and the water-soluble anionic modified polyvinyl alcohol (II) are jointly used as a dispersant, no special restriction is imposed on the sequence in which they are added. For example, the joint use may be effected by causing the inorganic pigment to be roughly dispersed in the aqueous medium by the use of the carboxyl group-containing water-soluble polymer (a) and/or the water-soluble condensed phosphate (b) and subsequently effecting fine dispersion of the inorganic pigment by adding the water-soluble anionic modified polyvinyl alcohol (II) to the rough dispersion or conversely by causing rough dispersion with the water-soluble anionic modified polyvinyl alcohol (II) and subsequently effecting fine dispersion by the addition of the carboxyl group-containing water-soluble polymer (a) and/or the water-soluble condensed phosphate (b). Otherwise, the carboxyl group-containing water-soluble polymer (a) and/or the water-soluble condensed phosphate (b) and the water-soluble anionic modified polyvinyl alcohol (II) can be added all at once.

Of course, the dispersant contemplated by the present invention can be used in the combination with any of the conventional organic dispersants, surfactants, and wetting agents such as, for example, polyethylene glycol, polyoxyethylene-polyoxypropylene copolymer or any of the conventional inorganic dispersants such as, for example, hydroxides, carbonates, halides, and phosphates of calcium, magnesium, aluminum and other similar polyvalent metals, on condition that the additives so incorporated will not impair the effect of the present invention.

As typical examples of the inorganic pigment to be used in the present invention, there can be cited clay, calcium carbonate, titanium dioxide, satin white, aluminum hydroxide, talc, slaked lime, magnesium hydroxide, iron oxide red, cement, alumina, zirconia, silica, silicon carbide, and silicon nitride. Among other inorganic pigments cited above, calcium carbonate and aluminum hydroxide prove to be particularly desirable. The most desirable of all is calcium carbonate.

Now, the present invention will be described more specifically below with reference to working examples. It should be noted, however, that this invention is not limited by these examples. Wherever parts and percents are mentioned in the following examples, they are meant respectively as parts by weight and percents by weight. The percents relative to calcium carbonate or the percents relative to aluminum hydroxide designate the percents by weight of the solids contents of the dispersants (combinations of carboxyl group-containing water-soluble polymer and/or water-soluble condensed phosphate and water-soluble anionic modified polyvinyl alcohol) relative to the solids contents of the inorganic pigments used.

Example 1

In a beaker (made of stainless steel, SUS 304, and measuring 90 mm in inside diameter and 160 mm in height) having an inner volume of 1 liter, 400 parts of the cake (solids content 65.3%) obtained by dehydrating calcite type cubic light calcium carbonate (primary particle diameter 0.15 micron) with a filter press was placed, 3.26 parts (0.5% relative to calcium carbonate) of an aqueous 40% polysodium acrylate solution having a number average molecular weight of 6,000 and 2.61 parts (0.2% relative to calcium carbonate) of an aqueous 20% anionic modified polyvinyl alcohol solution possessing a polymerization degree of 250, a saponification degree of 88 mol%, and a sulfonation degree of 3 mol% due to copolymerization with p-styrene sulfonic acid as a dispersant and 5.1 parts of water for adjustment of solids content were added to the cake, and the contents of the beaker were kneaded at a low speed with dissolver blades (50 mm in diameter) for 3 minutes and then dispersed at 3,000 rpm for 10 minutes, to obtain an aqueous dispersion (1) having a solids content of 64%.

The aqueous dispersion (1) was tested for viscosity (with a viscosimeters type B, at 25° C) for lasting stability. The results are shown in Table 1. The aqueous dispersion freshly prepared was tested for flow characteristics with a Hercules viscosimeter (produced by Kumagai Riki Kogyo K.K. and marketed under product code of "HR-801C") (bob B, sweep time 20 seconds). The rheogram consequently obtained is shown in FIG. 1.

Examples 2 through 30

Aqueous dispersions (2) through (30) having a fixed solids content of 64% were obtained by following the procedure of Example 1, excepting a varying carboxyl group-containing water-soluble polymer (a) and a varying water-soluble anionic modified polyvinyl alcohol (II) indicated as dispersant in Table 1 and water for the adjustment of solids content were used in amounts prescribed respectively in Table 1. The aqueous dispersions (2) through (30) consequently obtained were tested for viscosity and lasting stability in the same manner as in Example 1. The results are shown in Table 1.

Examples 31 through 36

Aqueous dispersions (31) through (36) having a fixed solids content of 64% were obtained by following the procedure of Example 1, excepting a varying water-soluble condensed phosphate (b) and a water-soluble anionic modified polyvinyl alcohol (II) indicated as dispersant in Table 1 and water for the adjustment of solids content were used in amounts prescribed respectively in Table 1. The aqueous dispersions (31) through (36) consequently obtained were tested for viscosity and lasting stability in the same manner as in Example 1. The results are shown in Table 1.

Control 1

An aqueous dispersion (1) for comparison having a solids content of 64% was obtained by following the procedure of Example 1, excepting 4.57 parts (0.7% relative to calcium carbonate) of a 40% aqueous solution of the sodium salt of a 60/40 (molar ratio) acrylic acid/maleic acid copolymer having a number average molecular weight of 5,200 as a dispersant and 6.4 parts of water for adjustment of solids content were used instead.

The aqueous dispersion (1) for comparison consequently obtained was tested for viscosity and lasting stability in the same manner as in Example 1. The results are shown in Table 2. The aqueous dispersion (1) for comparison freshly prepared was tested for flow characteristics with a Hercules viscosimeter (bob B, sweep time 20 seconds). The rheogram consequently obtained is shown in FIG. 1.

Controls 2 through 16

Aqueous dispersions (2) through (16) for comparison having a fixed solids content of 64% were obtained by following the procedure of Example 1, excepting a varying water-soluble carboxyl group-containing polymer (a) indicated as a dispersant in Table 2 in a fixed amount of 0.7% (relative to calcium carbonate) and water for adjustment of solids content in a prescribed amount were used instead The aqueous dispersions (2) through (16) consequently obtained were tested for viscosity and lasting stability in the same manner as in Example 1. The results are shown in Table 2.

Controls 17 and 18

Aqueous dispersions (17) and (18) for comparison having a fixed solids content of 64% were obtained by following the procedure of Example 1, excepting a varying water-soluble condensed phosphate (b) indicated as a dispersant in Table 2 in a fixed amount of 0.7% (relative to calcium carbonate) and water for adjustment of solids content in a prescribed amount were used instead. The aqueous dispersions (17) and (18) consequently obtained were tested for viscosity and lasting stability. The results are shown in Table 2.

Controls 19 through 21

Aqueous dispersions (19) through (21) for comparison having a fixed solids content of 64% were obtained by following the procedure of Example 1, excepting a varying water-soluble anionic modified polyvinyl alcohol (II) indicated as a dispersant in Table 2 in a fixed amount of 0.7% (relative to calcium carbonate) and water for adjustment of solids content in a prescribed amount were used instead. The aqueous dispersions (19) through (21) consequently obtained were tested for viscosity and lasting stability. The results are shown in Table 2.

Controls 22 through 66

Aqueous dispersions (22) through (66) for comparison having a fixed solids content of 64% were obtained by following the procedure of Example 1, excepting a varying carboxyl group-containing water-soluble polymer (a) or a varying carboxyli group-containing water-soluble polymer plus a water-soluble anionic modified polyvinyl alcohol (II) or a varying polyvinyl alcohol indicated as a dispersant in Table 2 in a prescribed amount and water for adjustment of solids content in a prescribed amount were added instead. The aqueous dispersions (22) through (66) consequently obtained were tested for viscosity and lasting stability. The results are shown in Table 2.

Controls 67 through 69

Aqueous dispersions (67) through (69) for comparison having a fixed solids content of 64% were obtained by following the procedure of Example 1, excepting a varying water-soluble condensed phosphate (b) and a varying polyvinyl alcohol indicated as a dispersant in Table 2 in prescribed amounts and water for adjustment of solids content in a prescribed amount were used instead. The aqueous dispersions (67) through (69) consequently obtained were tested for viscosity and lasting stability. The results are shown in Table 2.

TABLE 1

| Ex. | Carboxyl group containing water-soluble polymer (a) | | | | Water-soluble condensed phosphate (b) | | Water-soluble anionic modified polyvinyl alcohol (II) | | | | | | Viscosity of aqueous dispersion (cps) | |
|---|---|---|---|---|---|---|---|---|---|---|---|---|---|---|
| | Combination of monomers (molar ratio) | Kind of salt | Number average molecular weight | Amount used (%) | Name | Amount used (%) | polymerization degree | Saponification degree | Kind of anionic modification degree* | Monomer for modification | Kind of salt | Amount used (%) | Immediately after preparation | After one week's standing at room temperature |
| 1 | AA 100 | Na | 6,000 | 0.5 | — | 0 | 250 | 88 | S* 3 mol % | PSS | Na | 0.2 | 85 | 82 |
| 2 | AA | Na | 20,000 | 0.5 | — | 0 | 600 | 75 | C* | IA | Na | 0.2 | 92 | 94 |

TABLE 1-continued

| | Carboxyl group containing water-soluble polymer (a) | | | | Water-soluble condensed phosphate (b) | | Water-soluble anionic modified polyvinyl alcohol (II) | | | | | | Viscosity of aqueous dispersion (cps) | |
|---|---|---|---|---|---|---|---|---|---|---|---|---|---|---|
| Ex. | Combination of monomers (molar ratio) | Kind of salt | Number average molecular weight | Amount used (%) | Name | Amount used (%) | polymerization degree | Saponification degree | Kind of anionic modification degree* | Monomer for modification | Kind of salt | Amount used (%) | Immediately after preparation | After one week's standing at room temperature |
| 3 | AA/MAA 70/30 | K | 38,000 | 0.6 | — | 0 | 60 | 45 | S* 12 mol % | VS | Na | 0.1 | 110 | 115 |
| 4 | AA/MAA 30/70 | Na | 12,000 | 0.5 | — | 0 | 450 | 100 | S* 2 mol % | AS | acid form | 0.2 | 130 | 130 |
| 5 | MAA 100 | Na | 5,000 | 0.6 | — | 0 | 150 | 55 | C* 8 mol % | AA | K | 0.1 | 120 | 110 |
| 6 | AA/MA 90/10 | Na | 14,000 | 0.5 | — | 0 | 250 | 88 | S* 3 mol % | PSS | Na | 0.2 | 96 | 110 |
| 7 | AA/MA 70/30 | Na | 4,000 | 0.6 | — | 0 | 600 | 75 | C* 3 mol % | IA | Na | 0.1 | 110 | 105 |
| 8 | MAA/FA 95/5 | K | 17,000 | 0.6 | — | 0 | 450 | 100 | S* 1 mol % | AS | Na | 0.1 | 86 | 86 |
| 9 | AA/FA 75/25 | Na | 3,000 | 0.6 | — | 0 | 200 | 100 | C* 2 mol % | MA | acid form | 0.1 | 94 | 98 |
| 10 | AA/IA 93/7 | Na | 6,000 | 0.5 | — | 0 | 60 | 45 | S* 12 mol % | VS | Na | 0.2 | 91 | 89 |
| 11 | AA/IA 80/20 | Na | 12,000 | 0.6 | — | 0 | 80 | 55 | C* 9 mol % | AA | K | 0.1 | 105 | 105 |
| 12 | AA/HAPS 95/5 | Na | 17,000 | 0.5 | — | 0 | 250 | 88 | S* 3 mol % | PSS | Na | 0.2 | 88 | 85 |
| 13 | AA/HAPS 80/20 | Na | 4,000 | 0.6 | — | 0 | 600 | 75 | C* 3 mol % | IA | Na | 0.1 | 96 | 110 |
| 14 | MAA/AMPS 85/15 | Na | 3,000 | 0.6 | — | 0 | 450 | 100 | S* 1 mol % | AS | Na | 0.1 | 92 | 94 |
| 15 | AA/AMPS 60/40 | Na | 16,000 | 0.6 | — | 0 | 200 | 100 | C* 2 mol % | MA | acid form | 0.1 | 140 | 140 |
| 16 | AA/VS 90/10 | K | 32,000 | 0.5 | — | 0 | 60 | 45 | S* 12 mol % | VS | Na | 0.2 | 84 | 82 |
| 17 | AA/VS 70/30 | Na | 6,000 | 0.6 | — | 0 | 80 | 55 | C* 9 mol % | AA | K | 0.1 | 74 | 76 |
| 18 | AA/IPEA 90/10 | Na | 14,000 | 0.5 | — | 0 | 250 | 88 | S* 3 mol % | PSS | Na | 0.2 | 76 | 79 |
| 19 | AA/IPEA 70/30 | Na | 3,000 | 0.6 | — | 0 | 600 | 75 | C* 3 mol % | IA | Na | 0.1 | 94 | 92 |
| 20 | MAA/HEMA 95/5 | Na | 4,000 | 0.6 | — | 0 | 450 | 100 | S* 1 mol % | AS | Na | 0.1 | 110 | 110 |
| 21 | AA/HEMA 65/35 | Na | 16,000 | 0.6 | — | 0 | 200 | 100 | C* 2 mol % | MA | acid form | 0.1 | 84 | 83 |
| 22 | AA/N—MAM 90/10 | K | 31,000 | 0.5 | — | 0 | 60 | 45 | S* 12 mol % | VS | Na | 0.2 | 91 | 89 |
| 23 | AA/N—MAM 75/25 | Na | 6,000 | 0.6 | — | 0 | 80 | 55 | C* 9 mol % | AA | K | 0.1 | 96 | 105 |
| 24 | IB/MA 0.9/1 | Na | 7,000 | 0.5 | — | 0 | 250 | 88 | S* 3 mol % | PSS | Na | 0.2 | 240 | 210 |
| 25 | IB/MA 1.0/1 | NH4 | 60,000 | 0.6 | — | 0 | 600 | 75 | C* 3 mol % | IA | Na | 0.1 | 350 | 410 |
| 26 | PP/MA 0.8/1 | Ca | 5,000 | 0.6 | — | 0 | 450 | 100 | S* 1 mol % | AS | Na | 0.1 | 190 | 230 |
| 27 | PP/MA 0.9/1 | Na | 42,000 | 0.6 | — | 0 | 200 | 100 | C* 2 mol % | MA | acid form | 0.1 | 330 | 330 |
| 28 | BT/MA 1.1/1 | K | 10,000 | 0.5 | — | 0 | 60 | 45 | S* 12 mol % | AMPS | Na | 0.2 | 390 | 410 |
| 29 | IM/IB/MA 0.4/0.5/1 | Na | 33,000 | 0.6 | — | 0 | 80 | 55 | C* 9 mol % | AA | K | 0.1 | 370 | 330 |
| 30 | IB/MA/AD | Na | 5,000 | 0.6 | — | 0 | 60 | 45 | S* 12 mol % | VS | Na | 0.1 | 250 | 310 |

TABLE 1-continued

| | Carboxyl group containing water-soluble polymer (a) | | | | Water-soluble condensed phosphate (b) | | Water-soluble anionic modified polyvinyl alcohol (II) | | | | | | Viscosity of aqueous dispersion (cps) | |
|---|---|---|---|---|---|---|---|---|---|---|---|---|---|---|
| Ex. | Combination of monomers (molar ratio) | Kind of salt | Number average molecular weight | Amount used (%) | Name | Amount used (%) | polymerization degree | Saponification degree | Kind of anionic modification degree* | Monomer for modification | Kind of salt | Amount used (%) | Immediately after preparation | After one week's standing at room temperature |
| 31 | 0.95/1/0.05 — | — | — | 0 | SHMP | 0.5 | 250 | 88 | S* 3 mol % | PSS | Na | 0.2 | 190 | 210 |
| 32 | — | — | — | 0 | PPP | 0.5 | 600 | 75 | C* 3 mol % | IA | Na | 0.2 | 170 | 190 |
| 33 | — | — | — | 0 | PPP | 0.6 | 450 | 100 | S* 1 mol % | AS | Na | 0.1 | 230 | 230 |
| 34 | — | — | — | 0 | SHMP | 0.5 | 200 | 100 | C* 2 mol % | MA | acid form | 0.2 | 240 | 220 |
| 35 | — | — | — | 0 | SHMP | 0.6 | 60 | 45 | S* 12 mol % | VS | Na | 0.1 | 260 | 250 |
| 36 | — | — | — | 0 | SPP | 0.6 | 80 | 55 | C* 9 mol % | AA | K | 0.1 | 300 | 270 |

*S Sulfonation
C Carboxylation

TABLE 2

| | Carboxyl group containing water-soluble polymer (a) or carboxyl group containing water-soluble polymer | | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|---|
| Control | Combination of monomers (molar ratio) | Kind of Salt | Number average molecular weight | Amount used (%) | Name | Amount used (%) | polymerization degree | Saponification degree | Kind of anionic modification degree | Monomer for modification | Kind of salt | Amount used (%) | Immediately after preparation | After one week's standing at room temperature |
| 1 | AA/MA 60/40 | Na | 5,200 | 0.7 | — | 0 | — | — | — | — | — | 0 | 3,300 | 5,600 |
| 2 | AA/ 100 | Na | 6,000 | 0.7 | — | 0 | — | — | — | — | — | 0 | 5,300 | more than 10,000 |
| 3 | AA/MMA 30/70 | Na | 12,000 | 0.7 | — | 0 | — | — | — | — | — | 0 | more than 10,000 | more than 10,000 |
| 4 | AA/MA 90/10 | Na | 14,000 | 0.7 | — | 0 | — | — | — | — | — | 0 | 1,600 | 4,400 |
| 5 | AA/MA 70/30 | Na | 3,500 | 0.7 | — | 0 | — | — | — | — | — | 0 | 4,600 | 8,700 |
| 6 | AA/FA 75/25 | Na | 3,000 | 0.7 | — | 0 | — | — | — | — | — | 0 | 2,200 | 3,900 |
| 7 | AA/IA 93/7 | Na | 6,000 | 0.7 | — | 0 | — | — | — | — | — | 0 | 3,600 | 6,700 |
| 8 | AA/ HAPS 95/5 | Na | 17,000 | 0.7 | — | 0 | — | — | — | — | — | 0 | 2,500 | 4,600 |
| 9 | AA/ AMPS 60/40 | Na | 16,000 | 0.7 | — | 0 | — | — | — | — | — | 0 | 2,900 | 4,100 |
| 10 | AA/VS 90/10 | K | 32,000 | 0.7 | — | 0 | — | — | — | — | — | 0 | 3,600 | 4,800 |
| 11 | AA/ IPEA 90/10 | Na | 14,000 | 0.7 | — | 0 | — | — | — | — | — | 0 | 3,100 | 5,500 |
| 12 | AA/ HEMA 65/35 | Na | 16,000 | 0.7 | — | 0 | — | — | — | — | — | 0 | 4,600 | 6,700 |
| 13 | AA/ N—MAM 90/10 | K | 31,000 | 0.7 | — | 0 | — | — | — | — | — | 0 | 3,600 | 5,100 |
| 14 | IB/MA 0.9/10 | Na | 7,000 | 0.7 | — | 0 | — | — | — | — | — | 0 | more than 10,000 | more than 10,000 |

TABLE 2-continued

| | Carboxyl group containing water-soluble polymer (a) or carboxyl group containing water-soluble polymer | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|
| Control | Combination of monomers (molar ratio) | Kind of Salt | Number average molecular weight | Amount used (%) | Name | Amount used (%) | polymerization degree | Saponification degree | Kind of anionic modification degree | Monomer for modification | Kind of salt | Amount used (%) | Immediately after preparation | After one week's standing at room temperature |
| 15 | PP/MA 0.9/1 | Na | 42,000 | 0.7 | — | 0 | — | — | — | — | — | 0 | more than 10,000 | more than 10,000 |
| 16 | IM/IB/MA 0.4/0.5/1 | Na | 33,000 | 0.7 | — | 0 | | | | | | 0 | more than 10,000 | more than 10,000 |
| 17 | — | — | — | 0 | SHMP | 0.7 | — | — | — | — | — | 0 | more than 10,000 | more than 10,000 |
| 18 | — | — | — | 0 | PPP | 0.7 | — | — | — | — | — | 0 | more than 10,000 | more than 10,000 |
| 19 | — | — | — | 0 | — | 0 | 250 | 88 | S* 3 mol % | PSS | Na | 0.7 | more than 10,000 | more than 10,000 |
| 20 | — | — | — | 0 | — | 0 | 60 | 45 | S* 12 mol % | VS | Na | 0.7 | more than 10,000 | more than 10,000 |
| 21 | — | — | — | 0 | — | 0 | 600 | 75 | C* 3 mol % | IA | Na | 0.7 | more than 10,000 | more than 10,000 |
| 22 | AA 100 | Na | 6,000 | 0.5 | — | 0 | 1,000 | 88 | S* 3 mol % | PSS | Na | 0.2 | 340 | 1,400 |
| 23 | AA/MAA 70/30 | K | 38,000 | 0.6 | — | 0 | 20 | 45 | S* 12 mol % | VS | Na | 0.1 | 630 | 2,700 |
| 24 | AA 100 | Na | 20,000 | 0.5 | — | 0 | 1,200 | 75 | C* 3 mol % | IA | Na | 0.2 | 450 | 3,600 |
| 25 | MAA 100 | Na | 5,000 | 0.6 | — | 0 | 15 | 25 | C* 8 mol % | AA | K | 0.1 | 880 | 4,400 |
| 26 | AA 100 | Na | 6,000 | 0.5 | — | 0 | 250 | 88 | None | — | — | 0.2 | 480 | 8,700 |
| 27 | AA 100 | Na | 1,000 | 0.5 | — | 0 | 250 | 88 | S* 3 mol % | PSS | Na | 0.2 | 1,400 | 5,600 |
| 28 | AA/MAA 70/30 | K | 120,000 | 0.6 | — | 0 | 60 | 45 | S* 12 mol % | VS | Na | 0.1 | 2,300 | 6,700 |
| 29 | AA 100 | Na | 140,000 | 0.5 | — | 0 | 600 | 75 | C* 3 mol % | IA | Na | 0.2 | 1,800 | 4,100 |
| 30 | MAA 100 | Na | 1,500 | 0.6 | — | 0 | 150 | 55 | C* 8 mol % | AA | K | 0.1 | 2,100 | 3,900 |
| 31 | AA 100 | Na | 6,000 | 0.5 | — | 0 | 250 | 88 | S* 28 mol % | PSS | Na | 0.2 | 630 | 2,900 |
| 32 | MAA 100 | Na | 5,000 | 0.6 | — | 0 | 150 | 55 | C* 33 mol % | AA | K | 0.1 | 210 | 3,200 |
| 33 | AA/MA 90/10 | Na | 14,000 | 0.5 | — | 0 | 1,000 | 88 | S* 3 mol % | PSS | Na | 0.2 | 680 | 1,400 |
| 34 | AA/IA 93/7 | Na | 6,000 | 0.5 | — | 0 | 20 | 45 | S* 12 mol % | VS | Na | 0.2 | 960 | 2,600 |
| 35 | AA/MA 90/10 | Na | 14,000 | 0.5 | — | 0 | 250 | 88 | None | — | — | 0.2 | 440 | more than 10,000 |
| 36 | AA/MA 90/10 | Na | 140,000 | 0.5 | — | 0 | 250 | 88 | S* 3 mol % | PSS | Na | 0.2 | 2,200 | 6,100 |
| 37 | AA/MA 70/30 | Na | 700 | 0.6 | — | 0 | 600 | 75 | C* 3 mol % | IA | Na | 0.1 | 3,200 | 7,600 |
| 38 | MAA/FA 95/5 | K | 120,000 | 0.6 | — | 0 | 450 | 100 | S* 1 mol % | AS | Na | 0.1 | 1,400 | 4,700 |
| 39 | AA/FA 75/25 | Na | 800 | 0.6 | — | 0 | 200 | 100 | C* 2 mol % | MA | acid form | 0.1 | 4,900 | 6,600 |
| 40 | AA/IA 93/7 | Na | 600 | 0.5 | — | 0 | 60 | 45 | S* 12 mol % | VS | Na | 0.2 | 3,600 | 5,500 |
| 41 | AA/IA 80/20 | Na | 150,000 | 0.6 | — | 0 | 80 | 55 | C* 9 mol % | AA | K | 0.1 | 1,800 | 3,100 |
| 42 | AA/HAPS 80/20 | Na | 4,000 | 0.6 | — | 0 | 1,200 | 75 | C* 3 mol % | IA | Na | 0.1 | 540 | 970 |
| 43 | AA/VS 70/30 | Na | 6,000 | 0.6 | — | 0 | 15 | 25 | C* 9 mol % | AA | K | 0.1 | 1,100 | 3,600 |
| 44 | AA/HAPS | Na | 17,000 | 0.5 | — | 0 | 250 | 88 | None | — | — | 0.2 | 840 | more than |

TABLE 2-continued

| Control | Carboxyl group containing water-soluble polymer (a) or carboxyl group containing water-soluble polymer | | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|---|
| | Combination of monomers (molar ratio) | Kind of Salt | Number average molecular weight | Amount used (%) | Name | Amount used (%) | polymerization degree | Saponification degree | Kind of anionic modification degree | Monomer for modification | Kind of salt | Amount used (%) | Immediately after preparation | After one week's standing at room temperature |
| 45 | AA/HAPS 95/5 | Na | 130,000 | 0.5 | — | 0 | 250 | 88 | S* 3 mol % | PSS | Na | 0.2 | 3,600 | 10,000 4,200 |
| 46 | AA/HAPS 95/5 | Na | 1,500 | 0.6 | — | 0 | 600 | 75 | C* 3 mol % | IA | Na | 0.1 | 6,200 | 8,900 |
| 47 | AA/AMPS 80/20 | Na | 1,100 | 0.6 | — | 0 | 450 | 100 | S* 1 mol % | AS | Na | 0.1 | 3,900 | 5,500 |
| 48 | AA/AMPS 88/15 | Na | 120,000 | 0.6 | — | 0 | 200 | 100 | C* 2 mol % | MA | acid form | 0.1 | 2,700 | 5,600 |
| 49 | AA/VS 60/40 | K | 160,000 | 0.5 | — | 0 | 60 | 45 | S* 12 mol % | VS | Na | 0.2 | 6,500 | 9,700 |
| 50 | AA/VS 90/10 | Na | 1,600 | 0.6 | — | 0 | 80 | 55 | C* 9 mol % | AA | K | 0.1 | 3,600 | 4,500 |
| 51 | AA/IPEA 70/30 | Na | 14,000 | 0.5 | — | 0 | 1,000 | 88 | C* 3 mol % | PSS | Na | 0.2 | 560 | 1,900 |
| 52 | AA/N—MAM 90/10 | K | 31,000 | 0.5 | — | 0 | 20 | 45 | S* 12 mol % | VS | Na | 0.2 | 880 | 2,900 |
| 53 | AA/IPEA 90/10 | Na | 14,000 | 0.5 | — | 0 | 250 | 88 | None | — | — | 0.2 | 440 | 6,800 |
| 54 | AA/IPEA 90/10 | Na | 120,000 | 0.5 | — | 0 | 250 | 88 | S* 3 mol % | PSS | Na | 0.2 | 1,600 | 3,700 |
| 55 | AA/IPEA 70/30 | Na | 1,500 | 0.6 | — | 0 | 600 | 75 | C* 3 mol % | IA | Na | 0.1 | 4,300 | 7,500 |
| 56 | MAA/HEMA 95/5 | Na | 1,200 | 0.6 | — | 0 | 450 | 100 | S* 1 mol % | AS | Na | 0.1 | 3,800 | 5,400 |
| 57 | AA/HEMA 65/35 | Na | 130,000 | 0.6 | — | 0 | 200 | 100 | C* 2 mol % | MA | acid form | 0.1 | 3,300 | 6,400 |
| 58 | AA/N—MAM 90/10 | K | 160,000 | 0.5 | — | 0 | 60 | 45 | S* 12 mol % | VS | Na | 0.2 | 5,100 | 9,700 |
| 59 | AA/N—MAM 75/25 | Na | 1,400 | 0.6 | — | 0 | 80 | 55 | C* 9 mol % | AA | K | 0.1 | 4,800 | 7,200 |
| 60 | IB/MA 1.0/1 | NH4 | 60,000 | 0.6 | — | 0 | 1,200 | 75 | C* 3 mol % | IA | Na | 0.1 | 1,600 | 2,100 |
| 61 | IM/IB/MA 0.4/0.5/1 | Na | 33,000 | 0.6 | — | 0 | 15 | 25 | C* 9 mol % | AA | K | 0.1 | 3,000 | 3,600 |
| 62 | IB/MA 0.9/1 | Na | 7,000 | 0.5 | — | 0 | 250 | 88 | None | — | — | 0.2 | 650 | 5,600 |
| 63 | IB/MA 0.9/1 | Na | 1,300 | 0.5 | — | 0 | 250 | 88 | S* 3 mol % | PSS | Na | 0.2 | 3,100 | 6,900 |
| 64 | IB/MA 1.0/1 | NH4 | 150,000 | 0.6 | — | 0 | 600 | 75 | C* 3 mol % | IA | Na | 0.1 | 6,700 | 8,800 |
| 65 | PP/MA 0.8/1 | Ca | 1,200 | 0.6 | — | 0 | 450 | 100 | S* 1 mol % | AS | Na | 0.1 | 2,600 | 4,500 |
| 66 | PP/MA 0.9/1 | Na | 130,000 | 0.6 | — | 0 | 200 | 100 | C* 2 mol % | MA | acid form | 0.1 | 5,400 | 7,600 |
| 67 | — | — | — | 0 | SHMP | 0.5 | 1,000 | 88 | S* 3 mol % | PSS | Na | 0.2 | 540 | 890 |
| 68 | — | — | — | 0 | SPP | 0.6 | 15 | 25 | C* 9 mol % | AA | K | 0.1 | 840 | 2,500 |

TABLE 2-continued

| | Carboxyl group containing water-soluble polymer (a) or carboxyl group containing water-soluble polymer | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|
| Control | Combination of monomers (molar ratio) | Kind of Salt | Number average molecular weight | Amount used (%) | Name | Amount used (%) | polymerization degree | Saponification degree | Kind of anionic modification degree | Monomer for modification | Kind of salt | Amount used (%) | Immediately after preparation | After one week's standing at room temperature |
| 69 | — | — | — | 0 | SHMP | 0.5 | 250 | 88 | None | — | — | 0.2 | 410 | 5,400 |

*S Sulfonation
C Carboxylation
Abbreviation
AA Acrylic acid
MAA Methacrylic acid
MA Maleic acid
IA Itaconic acid
FA Fumaric acid
PSS p-styrene sulfonic acid
VS Vinyl sulfonic acid
HAPS 3-Allyloxy-2-hydroxypropane sulfonic acid
AMPS 2-Acrylamide-2-methylpropane sulfonic acid
AS Allyl sulfonic acid
IPEA Isopulenol
HEMA 2-Hydroxyethyl methacrylate
N—MAM N—methylol methacrylamide
IB Isobutylene
PP Propylene
BT 1-Butene
IM α-Isoamylene
AD Dodecyl acrylate
SHMP Sodium hexametaphosphate
PPP Potassium pyrophosphate
SPP Sodium pyrophosphate

Example 37

In the same stainless steel beaker as used in Example 1, 1.5 parts (0.2% relative to aluminum hydroxide) of a 40% aqueous solution of polysodium acrylate having a number average molecular weight of 6,000 was placed as a dispersant and water was added thereto a total amount of 97 parts. The contents of the beaker were kept stirred at a low speed with dissolver blades (50 mm in diameter) and 300 parts of finely divided aluminum hydroxide (average particle diameter of 0.8 micron) was added thereto over a period of 3 minutes. Then the resultant mixture was dispersed at 3,000 rpm for 10 minutes. Thereafter, 3.0 parts (0.2% relative to aluminum hydroxide) of a 20% aqueous solution of an anionic modified polyvinyl alcohol possessing a polymerization degree of 250, a saponification degree of 88 mol%, and a sulfonation degree of 3 mol% due to copolymerization with p-styrene sulfonic acid was added thereto. The resultant mixture was finely dispersed at 3,000 rpm for 2 minutes. Consequently, there was obtained an aqueous dispersion (37) having a solids content of 75%.

The aqueous dispersion (37) thus obtained was tested for viscosity (viscosimeter, B type at 25° C) and lasting stability. The results are shown in Table 3.

Examples 38 through 66

Aqueous dispersions (38) through (66) having a fixed solids content of 75% were obtained by following the procedure of Example 37, excepting a varying carboxyl group-containing water-soluble polymer (a) and a varying water-soluble anionic modified polyvinyl alcohol (II) indicated as a dispersant in Table 3 were used in prescribed amounts instead. The aqueous dispersions (38) through (66) consequently obtained were tested for viscosity and lasting stability in the same manner as in Example 37. The results are shown in Table 3.

Examples 67 through 72

Aqueous dispersions (67) through (72) having a fixed solids content of 75% were obtained by following the procedure of Example 37, excepting a varying water-soluble condensed phosphate (b) and a varying water-soluble anionic modified polyvinyl alcohol (II) indicated as a dispersant in Table 3 were used in prescribed amounts instead. The aqueous dispersions (67) through (72) consequently obtained were tested for viscosity and lasting stability. The results are shown in Table 3.

Control 70

In the same stainless steel beaker as used in Example 1, 3 parts (0.4% relative to aluminum hydroxide) of a aqueous solution of the sodium salt of a 60/40 (molar ratio) acrylic acid/maleic acid copolymer having a number average molecular weight of 5,200 as a dispersant and 97 parts of water were placed and kept stirred at a low speed with dissolver blades (50 mm in diameter) and 300 parts of the same finely divided aluminum hydroxide as used in Example 37 was added thereto over a period of 3 minutes. Then, the resultant mixture was dispersed at 3,000 rpm for 12 minutes to obtain an aqueous dispersion (70) for comparison having a solids content of 75%. The aqueous dispersion (70) for comparison consequently obtained was tested for viscosity and lasting stability in the same manner as in Example 37. The results are shown in Table 4.

Controls 71 through 85

Aqueous dispersions (71) through (85) for comparison were obtained by following the procedure of Control 70, excepting a varying water-soluble carboxyl group-containing polymer (a) indicated as a dispersant in Table 4 was used in a prescribed amount instead. The aqueous dispersions (71) through (85) for comparison consequently obtained were tested for viscosity and lasting stability. The results are shown in Table 4.

Controls 86 and 87

Aqueous dispersions (86) and (87) for comparison were obtained by following the procedure of Control 70, excepting a varying water-soluble condensed phosphate (b) indicated as a dispersant in Table 4 was used in a prescribed amount instead. The aqueous dispersions (86) and (87) consequently obtained were tested for viscosity and lasting stability. The results are shown in Table 4.

Controls 88 through 90

Aqueous dispersions (88) through (90) for comparison were obtained by following the procedure of Control 70, excepting a varying water-soluble anionic modified polyvinyl alcohol (II) indicated as a dispersant in Table 4 was used in a prescribed amount instead. The aqueous dispersions (88) through (90) for comparison consequently obtained were tested for viscosity and lasting stability. The results are shown in Table 4.

Controls 91 through 135

Aqueous dispersions (91) through (135) for comparison were obtained by following the procedure of Example 37, excepting a varying carboxyl group-containing polymer (a) or a varying carboxyl group-containing polymer and a varying water-soluble anionic modified polyvinyl alcohol (II) or a varying polyvinyl alcohol indicated as a dispersant in Table 4 were used in prescribed amounts instead. The aqueous dispersions (91) through (135) consequently obtained were tested for viscosity and lasting stability. The results are shown in Table 4.

Controls 136 through 138

Aqueous dispersions (136) through (138) for comparison were obtained by following the procedure of Example 37, excepting a varying water-soluble condensed phosphate (b) and polyvinyl alcohol indicated as a dispersant in Table 4 were used in prescribed amounts instead. The aqueous dispersions (136) through (138) for comparison consequently obtained were tested for viscosity and lasting stability. The results are shown in Table 4.

TABLE 3

| | Carboxyl group containing water-soluble polymer (a) | | | | Water-soluble condensed phosphate (b) | | Water-soluble anionic modified polyvinyl alcohol (II) | | | | | | Viscosity of aqueous dispersion (cps) | |
|---|---|---|---|---|---|---|---|---|---|---|---|---|---|---|
| Ex. | Combination of monomers (molar ratio) | Kind of salt | Number average molecular weight | Amount used (%) | Name | Amount used (%) | polymer-ization degree | Saponification degree | Kind of anionic modification degree* | Monomer for modification | Kind of salt | Amount used (%) | Immediately after preparation | After one week's standing at room temperature |
| 37 | AA 100 | Na | 6,000 | 0.2 | — | 0 | 250 | 88 | S* 3 mol % | PSS | Na | 0.2 | 450 | 470 |
| 38 | AA 100 | Na | 20,000 | 0.2 | — | 0 | 600 | 75 | C* 3 mol % | IA | Na | 0.2 | 510 | 530 |
| 39 | AA/MAA 70/30 | K | 38,000 | 0.2 | — | 0 | 60 | 45 | S* 12 mol % | VS | Na | 0.2 | 480 | 490 |
| 40 | AA/MAA 30/70 | Na | 12,000 | 0.2 | — | 0 | 450 | 100 | S* 2 mol % | AS | acid form | 0.2 | 430 | 430 |
| 41 | MAA 100 | Na | 5,000 | 0.2 | — | 0 | 150 | 55 | C* 8 mol % | AA | K | 0.2 | 460 | 450 |
| 42 | AA/MA 90/10 | Na | 14,000 | 0.2 | — | 0 | 250 | 88 | S* 3 mol % | PSS | Na | 0.2 | 390 | 390 |
| 43 | AA/MA 70/30 | Na | 4,000 | 0.2 | — | 0 | 600 | 75 | C* 3 mol % | IA | Na | 0.2 | 350 | 370 |
| 44 | MAA/FA 95/5 | K | 17,000 | 0.2 | — | 0 | 450 | 100 | S* 1 mol % | AS | Na | 0.2 | 380 | 370 |
| 45 | AA/FA 75/25 | Na | 3,000 | 0.2 | — | 0 | 200 | 100 | C* 2 mol % | MA | acid form | 0.2 | 350 | 370 |
| 46 | AA/IA 93/7 | Na | 6,000 | 0.2 | — | 0 | 60 | 45 | S* 12 mol % | VS | Na | 0.2 | 420 | 460 |
| 47 | AA/IA 80/20 | Na | 12,000 | 0.2 | — | 0 | 80 | 55 | C* 9 mol % | AA | K | 0.2 | 440 | 510 |
| 48 | AA/HAPS 95/5 | Na | 17,000 | 0.2 | — | 0 | 250 | 88 | S* 3 mol % | PSS | Na | 0.2 | 410 | 430 |
| 49 | AA/HAPS 80/20 | Na | 4,000 | 0.2 | — | 0 | 600 | 75 | C* 3 mol % | IA | Na | 0.2 | 430 | 430 |
| 50 | MAA/AMPS 85/15 | Na | 3,000 | 0.2 | — | 0 | 450 | 100 | S* 1 mol % | AS | Na | 0.2 | 390 | 430 |
| 51 | AA/AMPS 60/40 | Na | 16,000 | 0.2 | — | 0 | 200 | 100 | C* 2 mol % | MA | acid form | 0.2 | 370 | 370 |
| 52 | AA/VS | K | 32,000 | 0.2 | — | 0 | 60 | 45 | S* | VS | Na | 0.2 | 420 | 440 |

TABLE 3-continued

| Ex. | Carboxyl group containing water-soluble polymer (a) Combination of monomers (molar ratio) | Kind of salt | Number average molecular weight | Amount used (%) | Water-soluble condensed phosphate (b) Name | Amount used (%) | polymerization degree | Saponification degree | Water-soluble anionic modified polyvinyl alcohol (II) Kind of anionic modification degree* | Monomer for modification | Kind of salt | Amount used (%) | Viscosity of aqueous dispersion (cps) Immediately after preparation | After one week's standing at room temperature |
|---|---|---|---|---|---|---|---|---|---|---|---|---|---|---|
| 53 | AA/VS 90/10 | Na | 6,000 | 0.2 | — | 0 | 80 | 55 | C* 12 mol % | AA | K | 0.2 | 510 | 550 |
| 54 | AA/IPEA 70/30 | Na | 14,000 | 0.2 | — | 0 | 250 | 88 | S* 9 mol % | PSS | Na | 0.2 | 470 | 490 |
| 55 | AA/IPEA 90/10 | Na | 3,000 | 0.2 | — | 0 | 600 | 75 | C* 3 mol % | IA | Na | 0.2 | 440 | 470 |
| 56 | MAA/HEMA 70/30 | Na | 4,000 | 0.2 | — | 0 | 450 | 100 | S* 3 mol % | AS | Na | 0.2 | 400 | 390 |
| 57 | AA/HEMA 95/5 | Na | 16,000 | 0.2 | — | 0 | 200 | 100 | C* 1 mol % | MA | acid form | 0.2 | 520 | 520 |
| 58 | AA/N—MAM 65/35 | K | 31,000 | 0.2 | — | 0 | 60 | 45 | S* 2 mol % | VS | Na | 0.2 | 430 | 460 |
| 59 | AA/N—MAM 90/10 | Na | 6,000 | 0.2 | — | 0 | 80 | 55 | C* 12 mol % | AA | K | 0.2 | 460 | 490 |
| 60 | IB/MA 75/25 | Na | 7,000 | 0.2 | — | 0 | 250 | 88 | S* 9 mol % | PSS | Na | 0.2 | 380 | 440 |
| 61 | IB/MA 0.9/1 | NH4 | 60,000 | 0.2 | — | 0 | 600 | 75 | C* 3 mol % | IA | Na | 0.2 | 370 | 410 |
| 62 | PP/MA 1.0/1 | Ca | 5,000 | 0.2 | — | 0 | 450 | 100 | S* 3 mol % | AS | Na | 0.2 | 350 | 350 |
| 63 | PP/MA 0.8/1 | Na | 42,000 | 0.2 | — | 0 | 200 | 100 | C* 1 mol % | MA | acid form | 0.2 | 380 | 420 |
| 64 | BT/MA 0.9/1 | K | 10,000 | 0.2 | — | 0 | 60 | 45 | S* 2 mol % | AMPS | Na | 0.2 | 420 | 490 |
| 65 | IM/IB/MA 1.1/1 | Na | 33,000 | 0.2 | — | 0 | 80 | 55 | C* 12 mol % | AA | K | 0.2 | 400 | 450 |
| 66 | IB/MA/AD 0.4/0.5/1 | Na | 5,000 | 0.2 | — | 0 | 60 | 45 | S* 9 mol % | VS | Na | 0.2 | 430 | 440 |
| 67 | — | — | — | 0 | SHMP | 0.2 | 250 | 88 | S* 12 mol % | PSS | Na | 0.2 | 530 | 560 |
| 68 | — | — | — | 0 | PPP | 0.2 | 600 | 75 | C* 3 mol % | IA | Na | 0.2 | 540 | 550 |
| 69 | — | — | — | 0 | PPP | 0.2 | 450 | 100 | S* 3 mol % | AS | Na | 0.2 | 490 | 560 |
| 70 | — | — | — | 0 | SHMP | 0.2 | 200 | 100 | C* 1 mol % | MA | acid form | 0.2 | 540 | 590 |
| 71 | — | — | — | 0 | SHMP | 0.2 | 60 | 45 | S* 2 mol % | VS | Na | 0.2 | 480 | 560 |
| 72 | — | — | — | 0 | SPP | 0.2 | 80 | 55 | C* 12 mol % | AA | K | 0.2 | 520 | 580 |

*S Sulfonation
C Carboxylation

TABLE 4

| Control | Carboxyl group containing water-soluble polymer (a) or carboxyl group containing water-soluble polymer | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|
| | Combination of monomers (molar ratio) | Kind of Salt | Number average molecular weight | Name | Amount used (%) | polymerization degree | Saponification degree | Kind of anionic modification degree | Monomer for modification | Kind of salt | Amount used (%) | Immediately after preparation | After one week's standing at room temperature |
| 70 | AA/MA 60/40 | Na | 5,200 | 0.4 | — | 0 | — | — | — | — | — | 0 | 1,200 | 1,600 |
| 71 | AA 100 | Na | 6,000 | 0.4 | — | 0 | — | — | — | — | — | 0 | 3,500 | 4,500 |
| 72 | AA/MAA 30/70 | Na | 12,000 | 0.4 | — | 0 | — | — | — | — | — | 0 | 4,200 | 5,300 |
| 73 | AA/MA 90/10 | Na | 14,000 | 0.4 | — | 0 | — | — | — | — | — | 0 | 3,800 | 4,300 |
| 74 | AA/MA 70/30 | Na | 3,500 | 0.4 | — | 0 | — | — | — | — | — | 0 | 950 | 1,400 |
| 75 | AA/FA 75/25 | Na | 3,000 | 0.4 | — | 0 | — | — | — | — | — | 0 | 1,400 | 1,900 |
| 76 | AA/IA 93/7 | Na | 6,000 | 0.4 | — | 0 | — | — | — | — | — | 0 | 2,900 | 3,200 |
| 77 | AA/HAPS 95/5 | Na | 17,000 | 0.4 | — | 0 | — | — | — | — | — | 0 | 3,700 | 4,800 |
| 78 | AA/AMPS 60/40 | Na | 16,000 | 0.4 | — | 0 | — | — | — | — | — | 0 | 6,200 | 6,200 |
| 79 | AA/VS 90/10 | K | 32,000 | 0.4 | — | 0 | — | — | — | — | — | 0 | 4,400 | 5,300 |
| 80 | AA/IPEA 90/10 | Na | 14,000 | 0.4 | — | 0 | — | — | — | — | — | 0 | 3,500 | 4,100 |
| 81 | AA/HEMA 65/35 | Na | 16,000 | 0.4 | — | 0 | — | — | — | — | — | 0 | 5,400 | 6,400 |
| 82 | AA/N—MAM 90/10 | K | 31,000 | 0.4 | — | 0 | — | — | — | — | — | 0 | 4,100 | 5,500 |
| 83 | IB/MA 0.9/1 | Na | 7,000 | 0.4 | — | 0 | — | — | — | — | — | 0 | 1,800 | 2,800 |
| 84 | PP/MA 0.9/1 | Na | 42,000 | 0.4 | — | 0 | — | — | — | — | — | 0 | 1,600 | 2,500 |
| 85 | IM/IB/MA 0.4/0.5/1 | Na | 33,000 | 0.4 | — | 0 | — | — | — | — | — | 0 | 2,200 | 3,300 |
| 86 | — | — | — | 0 | SHMP | 0.4 | — | — | — | — | — | 0 | more than 10,000 | more than 10,000 |
| 87 | — | — | — | 0 | PPP | 0.4 | — | — | — | — | — | 0 | more than 10,000 | more than 10,000 |
| 88 | — | — | — | 0 | — | 0 | 250 | 88 | S* 3 mol % | PSS | Na | 0.4 | more than 10,000 | more than 10,000 |
| 89 | — | — | — | 0 | — | 0 | 60 | 45 | S* 12 mol % | VS | Na | 0.4 | more than 10,000 | more than 10,000 |
| 90 | — | — | — | 0 | — | 0 | 600 | 75 | C* 3 mol % | IA | Na | 0.4 | more than 10,000 | more than 10,000 |
| 91 | AA 100 | Na | 6,000 | 0.2 | — | 0 | 1,000 | 88 | S* 3 mol % | PSS | Na | 0.2 | 970 | 1,300 |
| 92 | AA/MAA 70/30 | K | 38,000 | 0.2 | — | 0 | 20 | 45 | S* 12 mol % | VS | Na | 0.2 | 1,200 | 1,900 |
| 93 | AA 100 | Na | 20,000 | 0.2 | — | 0 | 1,200 | 75 | C* 3 mol % | IA | Na | 0.2 | 1,400 | 1,700 |
| 94 | MAA 100 | Na | 5,000 | 0.2 | — | 0 | 15 | 25 | C* 8 mol % | AA | K | 0.2 | 1,100 | 2,900 |
| 95 | AA 100 | Na | 6,000 | 0.2 | — | 0 | 250 | 88 | None | — | — | 0.2 | 820 | 3,400 |
| 96 | AA 100 | Na | 1,000 | 0.2 | — | 0 | 250 | 88 | S* 3 mol % | PSS | Na | 0.2 | 2,200 | 2,700 |

TABLE 4-continued

| | Carboxyl group containing water-soluble polymer (a) or carboxyl group containing water-soluble polymer | | | | Water-soluble condensed phosphate (b) | | Water-soluble anionic modified polyvinyl alcohol (II) or polyvinyl alcohol | | | | | Viscosity of aqueous dispersion (cps) | |
|---|---|---|---|---|---|---|---|---|---|---|---|---|---|
| Control | Combination of monomers (molar ratio) | Kind of Salt | Number average molecular weight | Amount used (%) | Name | Amount used (%) | polymerization degree | Saponification degree | Kind of anionic modification degree | Monomer for modification | Kind of salt | Amount used (%) | Immediately after preparation | After one week's standing at room temperature |
| 97 | AA/MAA 70/30 | K | 120,000 | 0.2 | — | 0 | 60 | 45 | S* 12 mol % | VS | Na | 0.2 | 3,600 | 3,800 |
| 98 | AA 100 | Na | 140,000 | 0.2 | — | 0 | 600 | 75 | C* 3 mol % | IA | Na | 0.2 | 4,400 | 5,100 |
| 99 | MAA 100 | Na | 1,500 | 0.2 | — | 0 | 150 | 55 | C* 8 mol % | AA | K | 0.2 | 1,900 | 2,500 |
| 100 | AA 100 | Na | 6,000 | 0.2 | — | 0 | 250 | 88 | S* 28 mol % | PSS | Na | 0.2 | 1,400 | 1,400 |
| 101 | MAA 100 | Na | 5,000 | 0.2 | — | 0 | 150 | 55 | C* 33 mol % | AA | K | 0.2 | 1,600 | 2,500 |
| 102 | AA/MA 90/10 | Na | 14,000 | 0.2 | — | 0 | 1,000 | 88 | S* 3 mol % | PSS | Na | 0.2 | 770 | 1,100 |
| 103 | AA/IA 93/7 | Na | 6,000 | 0.2 | — | 0 | 20 | 45 | S* 12 mol % | VS | Na | 0.2 | 1,300 | 3,200 |
| 104 | AA/MA 90/10 | Na | 14,000 | 0.2 | — | 0 | 250 | 88 | None | — | — | 0.2 | 980 | 4,600 |
| 105 | AA/MA 90/10 | Na | 140,000 | 0.2 | — | 0 | 250 | 88 | S* 3 mol % | PSS | Na | 0.2 | 3,200 | 3,800 |
| 106 | AA/MA 70/30 | Na | 700 | 0.2 | — | 0 | 600 | 75 | C* 3 mol % | IA | Na | 0.2 | 3,900 | 4,600 |
| 107 | MAA/FA 95/5 | K | 120,000 | 0.2 | — | 0 | 450 | 100 | S* 1 mol % | AS | Na | 0.2 | 5,600 | 5,900 |
| 108 | AA/FA 75/25 | Na | 800 | 0.2 | — | 0 | 200 | 100 | C* 2 mol % | MA | acid form | 0.2 | 3,000 | 4,700 |
| 109 | AA/IA 93/7 | Na | 600 | 0.2 | — | 0 | 60 | 45 | S* 12 mol % | VS | Na | 0.2 | 4,500 | 5,200 |
| 110 | AA/IA 80/20 | Na | 150,000 | 0.2 | — | 0 | 80 | 55 | C* 9 mol % | AA | K | 0.2 | 4,100 | 5,500 |
| 111 | AA/HAPS 80/20 | Na | 4,000 | 0.2 | — | 0 | 1,200 | 75 | C* 3 mol % | IA | Na | 0.2 | 1,300 | 1,300 |
| 112 | AA/VS 70/30 | Na | 6,000 | 0.2 | — | 0 | 15 | 25 | C* 9 mol % | AA | K | 0.2 | 1,700 | 3,600 |
| 113 | AA/HAPS 95/5 | Na | 17,000 | 0.2 | — | 0 | 250 | 88 | None | — | — | 0.2 | 1,200 | 2,400 |
| 114 | AA/HAPS 95/5 | Na | 130,000 | 0.2 | — | 0 | 250 | 88 | S* | PSS | Na | 0.2 | 4,900 | 7,800 |
| 115 | AA/HAPS 80/20 | Na | 1,500 | 0.2 | — | 0 | 600 | 75 | C* 3 mol % | IA | Na | 0.2 | 1,800 | 2,400 |
| 116 | AA/AMPS 85/15 | Na | 1,100 | 0.2 | — | 0 | 450 | 100 | S* 1 mol % | AS | Na | 0.2 | 2,500 | 2,800 |
| 117 | AA/AMPS 60/40 | Na | 120,000 | 0.2 | — | 0 | 200 | 100 | C* 2 mol % | MA | acid form | 0.2 | 3,300 | 3,800 |
| 118 | AA/VS 90/10 | K | 160,000 | 0.2 | — | 0 | 60 | 45 | S* 12 mol % | VS | Na | 0.2 | 5,000 | 5,500 |
| 119 | AA/VS 70/30 | Na | 1,600 | 0.2 | — | 0 | 80 | 55 | C* 9 mol % | AA | K | 0.2 | 2,900 | 3,200 |
| 120 | AA/IPEA 90/10 | Na | 14,000 | 0.2 | — | 0 | 1,000 | 88 | S* 3 mol % | PSS | Na | 0.2 | 1,100 | 1,300 |
| 121 | AA/N—MAM 90/10 | K | 31,000 | 0.2 | — | 0 | 20 | 45 | S* 12 mol % | VS | Na | 0.2 | 1,400 | 3,500 |
| 122 | AA/IPEA 90/10 | Na | 14,000 | 0.2 | — | 0 | 250 | 88 | None | — | — | 0.2 | 1,000 | 4,300 |
| 123 | AA/IPEA 90/10 | Na | 120,000 | 0.2 | — | 0 | 250 | 88 | S* 3 mol % | PSS | Na | 0.2 | 4,200 | 4,200 |
| 124 | AA/IPEA 70/30 | Na | 1,500 | 0.2 | — | 0 | 600 | 75 | C* 3 mol % | IA | Na | 0.2 | 3,100 | 3,400 |
| 125 | MAA/ | Na | 1,200 | 0.2 | — | 0 | 450 | 100 | S* | AS | Na | 0.2 | 2,700 | 3,200 |

TABLE 4-continued

| | Carboxyl group containing water-soluble polymer (a) or carboxyl group containing water-soluble polymer | | | Water-soluble condensed phosphate (b) | | Water-soluble anionic modified polyvinyl alcohol (II) or polyvinyl alcohol | | | | | | Viscosity of aqueous dispersion (cps) | |
|---|---|---|---|---|---|---|---|---|---|---|---|---|---|
| Con- trol | Combina- tion of monomers (molar ratio) | Kind of Salt | Number average molec- ular weight | Amount used (%) | Name | Amount used (%) | poly- mer- iza- tion de- gree | Sapon- ifica- tion de- gree | Kind of anionic modifi- cation degree | Mono- mer for mod- ifica- tion | Kind of salt | Amount used (%) | Im- medi- ate- ly after prep- ara- tion | After one week's stand- ing at room temp- er- ature |
| | HEMA 95/5 | | | | | | | | 1 mol % | | | | | |
| 126 | AA/ HEMA 65/35 | Na | 130,000 | 0.2 | — | 0 | 200 | 100 | C* 2 mol % | MA | acid form | 0.2 | 5,600 | 6,400 |
| 127 | AA/ N—MAM 90/10 | K | 160,000 | 0.2 | — | 0 | 60 | 45 | S* 12 mol % | VS | Na | 0.2 | 7,400 | 8,900 |
| 128 | AA/ N—MAM 75/25 | Na | 1,400 | 0.2 | — | 0 | 80 | 55 | C* 9 mol % | AA | K | 0.2 | 1,300 | 1,600 |
| 129 | IB/MA 1.0/1 | NH4 | 60,000 | 0.2 | — | 0 | 1,200 | 75 | C* 3 mol % | IA | Na | 0.2 | 1,400 | 1,600 |
| 130 | IM/ IB/MA 0.4/0.5/1 | Na | 33,000 | 0.2 | — | 0 | 15 | 25 | C* 9 mol % | AA | K | 0.2 | 2,200 | 3,600 |
| 131 | IB/MA 0.9/1 | Na | 7,000 | 0.2 | — | 0 | 250 | 88 | None | — | — | 0.2 | 740 | 1,400 |
| 132 | IB/MA 0.9/1 | Na | 1,300 | 0.2 | — | 0 | 250 | 88 | S* 3 mol % | PSS | Na | 0.2 | 2,700 | 3,700 |
| 133 | IB/MA 1.0/1 | NH4 | 150,000 | 0.2 | — | 0 | 600 | 75 | C* 3 mol % | IA | Na | 0.2 | 6,300 | 7,200 |
| 134 | PP/MA 0.8/1 | Ca | 1,200 | 0.2 | — | 0 | 450 | 100 | S* 1 mol % | AS | Na | 0.2 | 3,400 | 4,000 |
| 135 | PP/MA 0.9/1 | Na | 130,000 | 0.2 | — | 0 | 200 | 100 | C* 2 mol % | MA | acid form | 0.2 | 5,200 | 6,300 |
| 136 | — | — | — | 0 | SHMP | 0.2 | 1,000 | 88 | S* 3 mol % | PSS | Na | 0.2 | 1,600 | 2,600 |
| 137 | — | — | — | 0 | SPP | 0.2 | 15 | 25 | C* 9 mol % | AA | K | 0.2 | 1,900 | 2,200 |
| 138 | — | — | — | 0 | SHMP | 0.2 | 250 | 88 | None | — | — | 0.2 | 1,700 | 4,600 |

*S Sulfonation
C Carboxylation

What is claimed is:

1. A method for the production of an aqueous dispersion by the dispersion of an inorganic pigment in an aqueous medium, which method comprises incorporating in said inorganic pigment as a dispersant (I) 0.1 to 2 parts by weight of a water-soluble condensed phosphate and (II) 0.03 to 1 part by weight of a water-soluble anionic modified polyvinyl alcohol possessing a polymerization degree in the range of 30 to 700, a saponification degree in the range of 30 to 100 mol%, and an anionic modification degree in the range of 0.5 to 20 mol%, respectively based on 100 parts by weight of said inorganic pigment.

2. A method according to claim 1, wherein said inorganic pigment is at least one member selected from the group consisting of calcium carbonate and aluminum hydroxide.

3. A method according to claim 1, wherein said inorganic pigment is calcium carbonate.

4. A method according to claim 1, wherein said inorganic pigment is aluminum hydroxide.

5. A method according to claim 1, wherein said water-soluble condensed phosphate (b) is at least one member selected from the group consisting of hexamethaphosphates and pyrophosphates.

6. A method according to claim 1, wherein said anionic modification of said water-soluble anionic modified polyvinyl alcohol (II) is modification by sulfonation or modification by carboxylation.

7. A method according to claim 1, wherein said water-soluble anionic modified polyvinyl alcohol (II) is a water-soluble polyvinyl alcohol modified by sulfonation.

8. A method according to claim 1, wherein said water-soluble anionic modified polyvinyl alcohol (II) is a water-soluble polyvinyl alcohol modified by carboxylation.

9. A method according to claim 1, wherein said water-soluble anionic modified polyvinyl alcohol (II) possesses a polymerization degree in the range of 100 to 300, a saponification degree in the range of 65 to 100 mol%, and an anionic modification degree in the range of 1 to 10 mol%.

10. A method according to claim 1, which method comprises incorporating in (I) 0.2 to 1.5 parts by weight of water-soluble condensed phosphate and (II) 0.05 to 0.8 part by weight of a water-soluble anionic modified polyvinyl alcohol.

* * * * *